US011265835B1

(12) United States Patent
Russell et al.

(10) Patent No.: US 11,265,835 B1
(45) Date of Patent: Mar. 1, 2022

(54) LOW SKEW SYNCHRONIZATION OF DISPARATE WIRELESS NODES IN A PYROTECHNIC ENVIRONMENT

(71) Applicant: Birket IP Holdings, Inc., Mahe (SY)

(72) Inventors: David Wayne Russell, Winter Garden, FL (US); Cory James Russell, Winter Garden, FL (US)

(73) Assignee: Birket IP Holdings, Inc., Mahe (SY)

( * ) Notice: Subject to any disclaimer, the term of this patent is extended or adjusted under 35 U.S.C. 154(b) by 0 days.

(21) Appl. No.: 16/900,051

(22) Filed: Jun. 12, 2020

Related U.S. Application Data

(60) Provisional application No. 62/860,420, filed on Jun. 12, 2019.

(51) Int. Cl.
*H04W 56/00* (2009.01)
*F42C 13/04* (2006.01)
*H04J 3/06* (2006.01)

(52) U.S. Cl.
CPC ......... *H04W 56/0015* (2013.01); *F42C 13/04* (2013.01); *H04J 3/0658* (2013.01); *H04W 56/004* (2013.01)

(58) Field of Classification Search
None
See application file for complete search history.

(56) References Cited

U.S. PATENT DOCUMENTS

| | | | |
|---|---|---|---|
| 2008/0232344 A1* | 9/2008 | Basu | G01D 21/00 370/350 |
| 2017/0359139 A1* | 12/2017 | Butterworth | H04L 69/08 |
| 2019/0116021 A1* | 4/2019 | Tanwar | H04J 3/0673 |

* cited by examiner

*Primary Examiner* — Anh Ngoc M Nguyen
(74) *Attorney, Agent, or Firm* — Allen, Dyer, Doppelt & Gilchrist, P.A.

(57) ABSTRACT

A system and method of effecting time synchronization between disparate nodes on a network where at least one node has knowledge of the true network time, at least one other node requires synchronization to the true network time, and a third node is utilized to facilitate the synchronization process.

24 Claims, 3 Drawing Sheets

LOW SKEW SYNCHRONIZATION OF DISPARATE WIRELESS NODES IN A PYROTECHNIC ENVIRONMENT

CROSS-REFERENCE TO RELATED APPLICATION

This application claims the benefit of U.S. Provisional Patent Application Ser. No. 62/860,420, filed on Jun. 12, 2019, the contents of which are herein incorporated by reference in their entirety.

FIELD OF THE INVENTION

The field of the invention relates generally to synchronization of wireless nodes which are used to initiate a pyrotechnic device.

BACKGROUND OF THE INVENTION

Previous attempts at achieving zero latency for timed pyrotechnic events specify that synchronization between modules must be achieved. In some systems the latency of RF communications packets transmitted and received are asymmetric, i.e. the transmit latency is not equal to nor directly correlatable to the receive latency.

In many systems the transmit latency is unpredictable, as it is dependent on various queues and real-time thread sequencing within the host system and the RF system, plus the additional latency of waiting for a clear transmission channel and/or an unpredictable number of potential retransmit cycles. In contrast, most systems have relatively predictable receive latency because the receiver must respond in real time to the incoming transmit timing and bitrate.

It is also true that in pyrotechnic systems event timing is critical to the show performance and bandwidth of the transmission system is often limited. While other synchronization techniques, such as Network Time Protocol (NTP), used in Ethernet systems are effective in wired systems and those with high bandwidth wireless bridges, they require significantly greater bandwidth than may be available in a pyrotechnic controller. Moreover, the pyrotechnic control system may not be operating in a true peer-to-peer system applicable to NTP.

The bandwidth problem is exacerbated if the pyrotechnics system is implemented as a centralized controller communicating with some number of pyrotechnic ignition modules. The modules may be constructed so as to minimize communications between ignition modules and maximize the communications bandwidth available to the central controller. In some systems there may be 1000 or more ignition modules for each centralized controller. It is also worth noting that the bandwidth limitations diminish with the number of modules such that if there are a very small number of modules, such as but not limited to one ignition controller and one central controller for example, other synchronization strategies such as NTP may become acceptable.

In other systems, synchronization is achieved by transmitting one or more packets from one communications node with knowledge of the given system time to another node with no knowledge of the system time. Over a number of packet transmissions in one or both directions, one can assume that the average latency between the two can be subtracted out but this leaves the actual skew between the two nodes equivalent to the magnitude of the average latency in the worst case transmission path. As discussed above, this average latency may be large and is subject to change over time as the RF environment of the pyrotechnics venue changes. Measurements of useable channels and channel saturation may be radically different between the morning of setup and evening showtime when perhaps tens of thousands of spectators with cellular network devices, wireless microphones, wireless speaker systems, and other wireless infrastructure devices are added to the venue.

Accordingly, it would be beneficial to have a method and apparatus for synchronization that takes into account one or more of the issues discussed above as well as possibly other issues.

SUMMARY OF THE INVENTION

In view of the foregoing, it is an object of the present invention to provide improved systems and methods for effecting time synchronization between disparate nodes on a network in a pyrotechnic environment. According to an embodiment of the present invention, a system and method for effecting time synchronization between disparate nodes on a network where at least one node has knowledge of the true network time, at least one other node requires synchronization to the true network time, and a third node is utilized to facilitate the synchronization process This synchronization strategy is implemented with at least two other communications nodes in the system other than the centralized controller. The application purpose of these nodes is immaterial, as long as they utilize the same or compatible RF signaling and communications system and protocol as the centralized controller.

Given at least three communications nodes denoted herein as A, B, and C, A will be designated as the central controller whose function will include being the master clock. The purpose of the system is to synchronize B and C. Here B will be designated as the node to be synchronized, and C will be designated a "helper" node.

In one embodiment, the first transmission is a unicast packet from A to C. The centralized controller sends a request to the helper node to send a synchronization transmission. This first transmission is not dependent on any latency in A's transmission path or C's receiver path. The second transmission is a broadcast packet from C to all other modules, here A and B.

This transmission is independent of the C's transmission latency but is dependent on A and B's receive latency. It is assumed that the receive latency is nearly equivalent for A and B. The final transmission is a broadcast message from A to B with the time on the Master Clock at which A received the synchronization message from C. This message is not dependent on the transmit or receive latency of A or B. B calculates the offset to its clock given the time at A and B should be identical, and B is now synchronized with a skew limited to the difference between the receive latency of A and B.

These and other objects, aspects and advantages of the present invention will be better appreciated in view of the drawings and following detailed description of preferred embodiments.

DETAILED DESCRIPTION OF PREFERRED EMBODIMENTS

Figure 1:
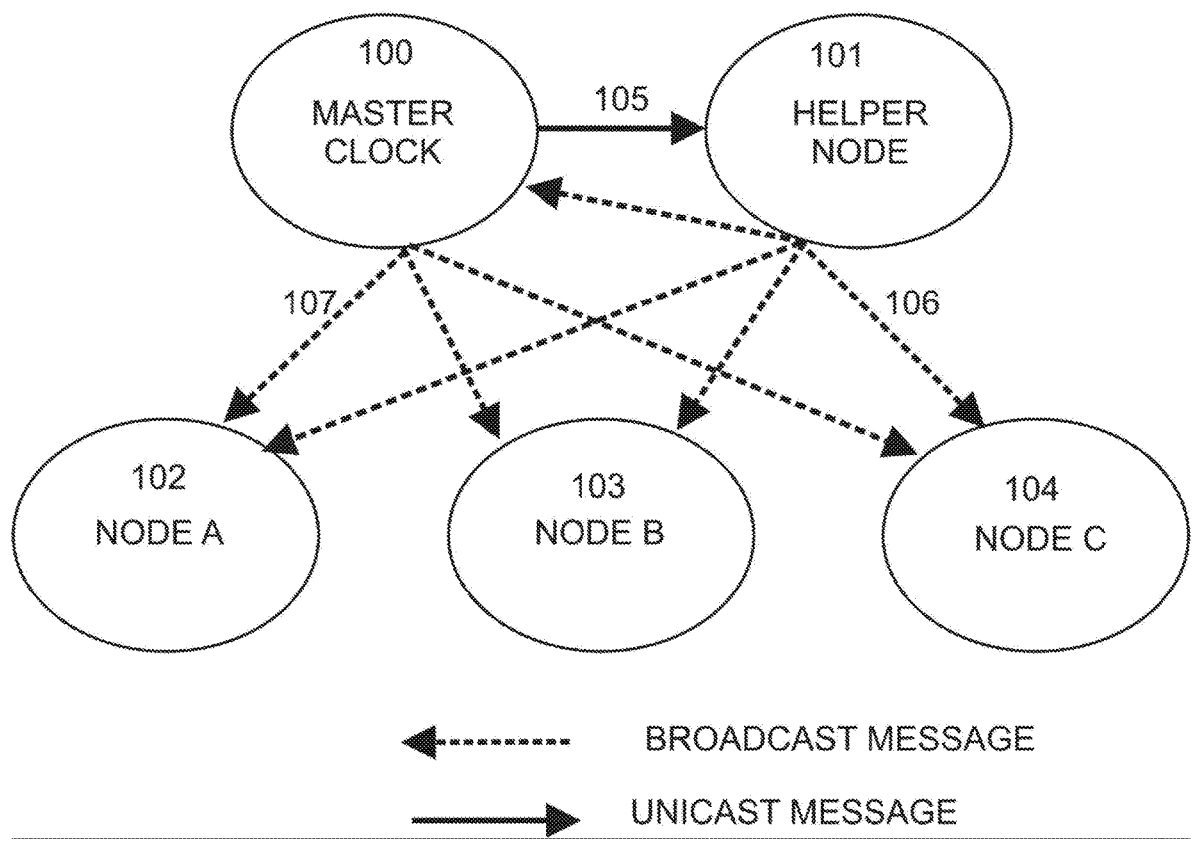
FIG. 1 depicts a synchronization system communications sequence between a central controller and a number of ignition controllers or other wireless devices, according to an embodiment of the present invention.

According to an embodiment of the present invention, referring to FIG. 1, a pyrotechnic control system is comprised of three or more nodes, each node may be similar or having different functions such as but not limited to a central controller 100, pyrotechnic ignition modules 101, 102, a music source 103, and a digital multiplexing (DMX) lighting control 104. All of the modules are wireless communications nodes having similar wireless communications equipment by means of which each module has access to all other modules.

The wireless transmission medium may include infrared (IR), satellite communications, cellular network communications, radio frequency communications, Bluetooth, LoRa, Bluetooth LE, or the like. Alternately, modules could be wired, utilizing Ethernet, RS-422, RS-485, discrete serial or parallel communications, among other examples. A given system may include both wired and wireless modules.

The communications infrastructure could be packetized, including but not limited to Direct Sequence Spread Spectrum (DSSS), Frequency Hopping Spread Spectrum (FHSS), Amplitude Modulated, Quadrature Encoded, or Frequency Modulated transmissions from a single frequency to Ultra Wideband (UWB) transmissions at a variety of protocols. Preferably, at least one side of the transmission/reception implementation of the transmission system is relatively stable in latency, while the other side may be highly variable and unpredictable. The system works in a similar manner and with similar results whether the transmission or reception part of the path is stable, as well as in the case where both sides are stable.

In the embodiment depicted in FIG. 1, the central controller 100 is also the master clock source. Alternately, any of the other modules could also serve as the master clock source, and in some implementations the music or audio player 103 may be the master clock source instead of the central controller. Depending on the implementation of the pyrotechnic control system, any communications node on the network may be designated as the master clock source within the scope of the present invention.

In the depicted embodiment, the initiation transmission 105 of the sequence is from any node with knowledge of the master clock time, i.e. the node has access to or has previously been synchronized to the master clock. This node sends a unicast message to another node in the network 101. In most cases any node is acceptable and may be selected at random.

In another embodiment, where the node initiating the transfer has knowledge of the other nodes of which it may choose a helper, the node would choose a helper which is already synchronized as this removes a step from the process as described in greater detail below.

This helper node is not required, however, to be synchronized at the inception of the process. This message requests the "helper" node to send out a synchronization message. The helper may send out the synchronization message as soon as possible, or the synchronization message might be timed or delayed or synchronized to other events or states in the network.

At some time after receiving the request from the master clock node 100 the helper node 101 transmits a broadcast initial synchronization message 106. This message is not dependent on the transmission or receiver latency of the helper node. As the message is broadcast, it is received with only speed-of-light delays at all other nodes 100, 102, 103, 104. All the nodes which receive the synchronization message note the time at which the message was received. The message is not dependent on the latency of the transmission side, but the noted time at which it is received is dependent on the latency of the receiver side. The receiver times are likely to be closely related and that the skew between the modules will therefore be related to the difference in the receiver latency of each module.

Once the master clock node 100 which initiated the sequence receives the helper node's synchronization message and notes the time, this node transmits a final synchronization message 107 broadcast to all nodes which includes the master time corresponding to the reception of the message. This message is not dependent on the transmit or receive latency of the broadcast node. Once each of the nodes which received the first synchronization message also receives the second message, that node can calculate the offset to alter its master clock to match the overall system master clock. The skew between the two nodes is then only the time difference between the receiver latency of the main node and the receiver latency of the secondary node.

In this embodiment, any nodes that missed one or the other of the synchronization messages or the helper node 101 would not be synchronized. The process is repeated with a different helper node until all nodes are synchronized. Nodes which are already synchronized could ignore any further synchronization attempts and/or attempts within a certain time window.

At any time additional network nodes may be added to or deleted from the network. The synchronization sequence is simply re-run as necessary to synchronize new nodes as they appear. In addition, the clock oscillators within each node have an unknown amount of drift due to component tolerances and the skew between two given nodes may increase over time.

Advantageously, the synchronization system is scheduled to run at specific events and over defined time intervals which may be determined by a combination of factors set in the software and/or set by user preferences. The specific events may include a combination of, but not be limited to: user initiation at any time; initiation at start or cessation of continuity test modes; system arming; or reception of Society of Motion Picture and Television (SMPTE) timecode.

Timed events may also be multi-agent events, i.e. as part of the initial step of requesting the helper node to initiate the synchronization function, the central controller may also instruct a given node to periodically initiate the synchronization system to the entire network or to a defined or random subset thereof. In a multi-agent embodiment of the system, multiple helper nodes with similar or different periodic instructions and network subset definitions could be set up by the master clock controller or by the central controller.

Figure 2:
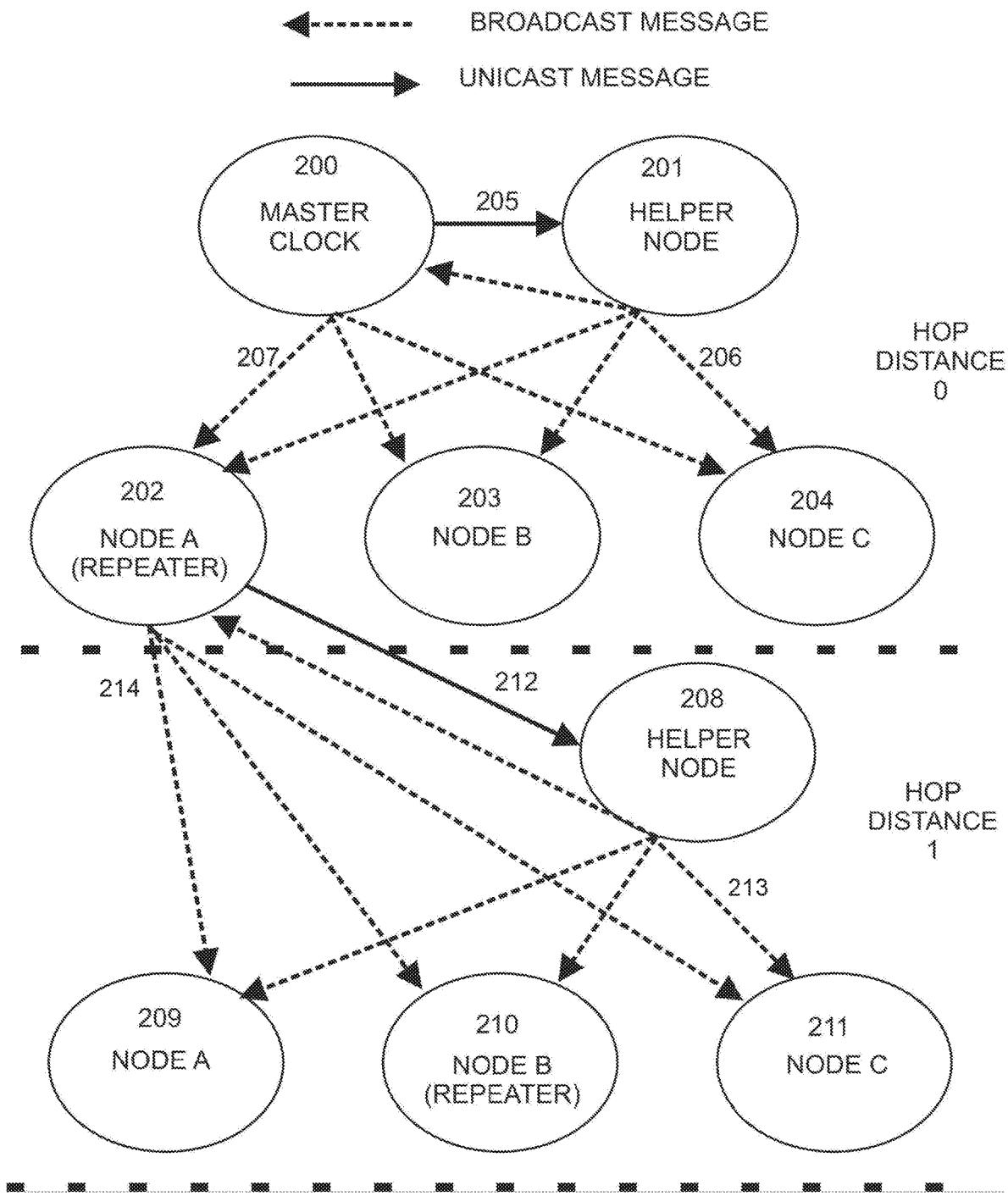
FIG. 2 depicts a network configuration with obstacles and nodes acting as repeaters to form a mesh network, according to another embodiment of the present invention.

Referring to FIG. 2, according to another embodiment of the present invention, if a mesh network is implemented such that all wireless nodes may be reached by the network even if obstacles or distance prevent a direct connection between any two nodes, then the second node may still be reached by routing the unicast or broadcast message through one or more nodes acting as repeaters. The simplified system as described in FIG. 1, however, assumes that once the synchronization packet from the "helper" node is physically transmitted, there is only speed-of-light delay difference between when the clock master module and the module to be synchronized receive the transmission. In the case of a mesh network utilizing repeaters, the repeating nodes introduce additional delays which would be added into the skew for that node.

In some pyrotechnic systems the average timing error of the system from other sources may be on the order of 5 to 10 milliseconds (mS). If the timing error of the pyrotechnic system due to skew is acceptable as, for example, 1 mS and the skew for retransmission through a repeater is measured in microseconds (µS), then the additional skew for repeaters may be ignored.

The time delay can be accounted for if the repeater node has been previously synchronized with the master clock. The system is then segmented into hop distances, i.e. the number of repeaters which must be utilized to connect the entire network.

All nodes which can be directly reached by the central node or master clock node 200 have a hop distance of 0. Nodes which must pass through one and only one repeater 208 to be reached by the central or master clock node have a hop distance of 1, and so on. The master node 200 then directly synchronizes all nodes with a hop distance of 0 and this would, by definition, include the repeater node 202 (there could be more than one) between nodes at hop distance 0 and nodes of hop distance 1. This uses initiation, initial synchronization and final synchronization messages 205, 206, 207 in the same manner as described above with messages 105, 106, 107.

The repeater nodes at hop distance 0 then become the master clock nodes for all nodes at hop distance 1, select a helper node 208 and synchronize all of the hop 1 devices 209, 210, 211 to their clock, which is fundamentally the same as the master clock by the definition of acceptable skew. The repeater node 202 uses the initiation, initial synchronization and final synchronization messages 212, 213, 214 in the same manner as described above with messages 105, 106, 107.

Any nodes which bridge to nodes at hop distance 2 would therefore be part of the hop distance 1 group, and they would go on to synchronize all devices at hop distance 2, and so on.

Figure 3:
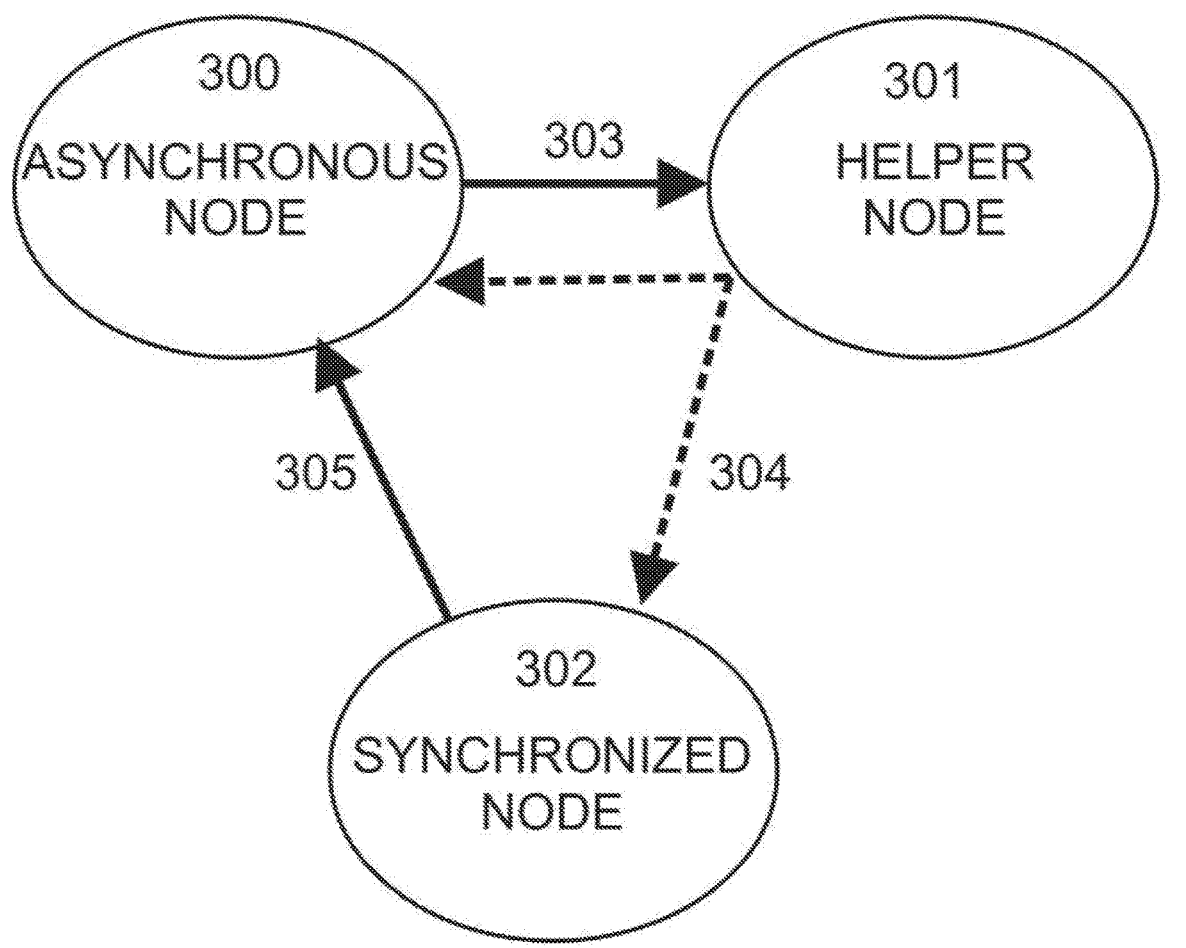
FIG. 3 depicts a network configuration where a distributed processing paradigm is used and each unsynchronized module initiates its own synchronization sequence, according to a further embodiment of the present invention.

In a further embodiment, referring to FIG. 3, all nodes could process the synchronization in an ad hoc distributed processing architecture, where each node 300 attempts to synchronize itself by finding two other nodes, one which can be a "helper" node 301, and another which has been synchronized 302. The same series of transmissions occurs, but in this case the process is initiation message 303 is transmitted to the helper node 301 by an asynchronous node. The helper node 301 transmits the initial synchronization message 304, just as with the message 106, and the synchronized node 302 sends the final synchronization message 305, just as with the message 107, except the message 305 could be sent as a unicast transmission back to the initiating asynchronous node 300.

Inasmuch as this paradigm shifts the synchronization control from the master clock node to distributed processing across all nodes, it removes the requirements for the master clock node to control when and how other nodes are synchronized. When a new node is added, it simply initiates its own synchronization with the rest of the system. Over time, each node can automatically initiate its own re-synchronization to account for any drift. Additionally, as each synchronization is now by definition only within its own hop level, the mechanics of structuring the synchronization by hop levels becomes unnecessary.

In an additional embodiment, two systems with different wireless and/or protocol implementations can by synchronized via a bridge module or node which has knowledge of both protocols. If the system has more than two different protocols, the system can be extended if either additional bridge modules with knowledge of unique combinations of the multiple protocols are implemented or if one or more bridge nodes with knowledge of two or more protocols are implemented.

The foregoing description of preferred embodiments is provided for exemplary and illustrative purposes; the present invention is not necessarily limited thereto. For example, the present invention is described in the context of network nodes used in a pyrotechnic environment; however, aspects of the present invention could be usefully implemented in other network contexts. Those skilled in the art will appreciated that this and other modifications, as well as adaptations to particular circumstances, will fall within the scope of the invention as herein shown and described.

What is claimed is:

1. A method of synchronizing nodes of a wireless network, the method comprising:
    sending an initiation transmission from a first node to a second node, the initiation transmission directing the second node to wirelessly transmit an initial synchronization message to at least the first node and a third node;
    at the second node, wirelessly transmitting the initiation synchronization message;
    at the first and third nodes, noting a receipt time of the initial synchronization message;
    transmitting from a synchronized one of the first and third nodes a final synchronization message including the noted receipt time;
    at an unsynchronized one of the first and third nodes, calculating an offset between its noted receipt time and the noted receipt time of the final synchronization message; and
    at the unsynchronized one of the first and third nodes, altering its clock time to match a clock time of the synchronized one of the first and third nodes using the calculated offset.

2. The method of claim 1, wherein the initiation transmission is sent wirelessly.

3. The method of claim 2, wherein the initiation transmission is a unicast message.

4. The method of claim 1, wherein the final synchronization message is sent wirelessly.

5. The method of claim 1, further comprising, at the first node, randomly selecting the second node from a plurality of nodes of the wireless network prior to sending the initiation transmission.

6. The method of claim 1, wherein the first node is the synchronized one of the first and third nodes.

7. The method of claim 6, wherein the first node includes a master clock source for the wireless network.

8. The method of claim 1, wherein the second node is unsynchronized and the method further comprises synchronizing the second node using another node of the wireless network to wirelessly transmit a subsequent initial synchronization message.

9. The method of claim 8, wherein any already synchronized nodes that receive the subsequent initial synchronization message ignore the subsequent initial synchronization message unless received outside a certain time window.

10. The method of claim 1, wherein the wireless network further includes a fourth node that is unsynchronized and which receives the initial synchronization message, the final synchronization message, calculates the offset between its noted receipt time and the noted receipt time of the final synchronization message, and alters its clock time to match the clock time of the synchronized one of the first and third nodes using the calculated offset.

11. The method of claim 1, wherein the first and third nodes are both at a hop distance of zero from the second node and the wireless network further includes fourth and fifth nodes which are both at a hop distance of at least one from the second node, and at least one of the first and third nodes being at a hop distance of zero from the fourth and fifth nodes; and the method further comprises:

after synchronizing the unsynchronized one of the first and third nodes using the at least one of the first and third nodes as a repeater node to send a subsequent initiation transmission from to the fourth node, the initiation transmission directing the fourth node to wirelessly transmit a subsequent initial synchronization message to at least the repeater node and the fifth node;

at the fourth node, wirelessly transmitting the subsequent initiation synchronization message;

at the repeater and fifth nodes, noting a receipt time of the subsequent initial synchronization message;

transmitting from the repeater node a subsequent final synchronization message including the noted receipt time;

at the fifth node, calculating an offset between its noted receipt time and the noted receipt time of the subsequent final synchronization message; and at the fifth node, altering its clock time to match the clock time of the repeater node using the calculated offset.

12. The method of claim 1, wherein the first node sends the initiation transmission at a defined time interval.

13. The method of claim 1, wherein the first node sends the initiation transmission based on the occurrence of at least one specific event.

14. The method of claim 13, wherein the at least one specific event is receipt of a user initiation.

15. The method of claim 13, wherein the at least one specific event is a start or cessation of continuity test mode.

16. The method of claim 13, wherein the wireless network is part of a pyrotechnic control system and the at least one specific event is system arming.

17. The method of claim 13, wherein the wireless network is part of a pyrotechnic control system and the at least one specific event is receipt of a timecode.

18. The method of claim 1, wherein the wireless network is part of a pyrotechnic control system and at least one of the first, second and third nodes is a central controller and at least another one of the first, second and third nodes is a pyrotechnic ignition module.

19. The method of claim 7, wherein the first node is the central controller.

20. A pyrotechnic control system comprising:
a central controller module;
a pyrotechnic ignition module; and
at least one additional module;
wherein each of the modules is a node in a wireless network and
at least a first one of the modules is configured to send an initiation transmission from a second one of the modules, the initiation transmission directing the second one of the modules to wirelessly transmit an initial synchronization message to at least the first one of the modules and a third one of the modules;
at the second one of the modules, wirelessly transmitting the initiation synchronization message;
at the first and third ones of the modules, noting a receipt time of the initial synchronization message;
transmitting from a synchronized one of the first and third ones of the modules a final synchronization message including the noted receipt time;
at an unsynchronized one of the first and third ones of the modules, calculating an offset between its noted receipt time and the noted receipt time of the final synchronization message; and
at the unsynchronized one of the first and third ones of the modules, altering its clock time to match a clock time of the synchronized one of the first and third ones of the modules using the calculated offset.

21. The system of claim 20, wherein the central controller module is the first one of the modules.

22. The system of claim 21, wherein the first one of the modules is the synchronized one of the first and third modules.

23. The system of claim 22, wherein the central controller is a master clock source of the pyrotechnic control system.

24. The system of claim 20, wherein the at least one additional module is at least one of: a music source; and a digital multiplexing lighting control.

* * * * *